US006600413B1

(12) United States Patent
Lo

(10) Patent No.: US 6,600,413 B1
(45) Date of Patent: Jul. 29, 2003

(54) AUTOMOBILE EFFICIENCY METER

(76) Inventor: Jui-Yang Lo, No.2, Alley 27, Lane 143, Yuanshan Rd., Jungle City, Taipei Hsien (TW)

( * ) Notice: Subject to any disclaimer, the term of this patent is extended or adjusted under 35 U.S.C. 154(b) by 0 days.

(21) Appl. No.: 10/086,705

(22) Filed: Mar. 4, 2002

(51) Int. Cl.[7] .................................................. B60Q 1/00

(52) U.S. Cl. ......................... 340/439; 340/441; 701/99; 701/110

(58) Field of Search ................................ 340/439, 441; 701/99, 110

(56) References Cited

U.S. PATENT DOCUMENTS

| | | | | | |
|---|---|---|---|---|---|
| 3,704,445 | A | * | 11/1972 | Lanham | 340/441 |
| 4,472,777 | A | * | 9/1984 | Youngblood | 701/110 |
| 4,500,868 | A | * | 2/1985 | Tokitsu et al. | 340/439 |
| 4,866,616 | A | * | 9/1989 | Takeuchi et al. | 701/35 |
| 5,303,163 | A | * | 4/1994 | Ebaugh et al. | 700/274 |
| 5,309,139 | A | * | 5/1994 | Austin | 340/462 |
| 5,394,136 | A | * | 2/1995 | Lammers et al. | 340/439 |
| 5,758,299 | A | * | 5/1998 | Sandborg et al. | 701/29 |
| 6,411,888 | B1 | * | 6/2002 | Weisman, II | 701/115 |
| 2002/0140552 | A1 | * | 10/2002 | Wada | 340/438 |

* cited by examiner

*Primary Examiner*—Daniel J. Wu
*Assistant Examiner*—Anne V. Lai
(74) *Attorney, Agent, or Firm*—Rosenberg, Klein & Lee

(57) ABSTRACT

Disclosed herein is an automobile efficiency meter which is capable of defining an optimistic efficiency zone by analyzing a speed-frequency (S-hz) variable and an engine revolution-frequency (R-hz) variable The driver is then informed about the vehicle condition by a pointer type or a digital type metering instrument, an indicator lighting unit, or a sounder thereby enabling him/her to keep the automobile in the best efficient condition so as to save fuel consumption and prolong the vehicle life.

5 Claims, 3 Drawing Sheets

AUTOMOBILE EFFICIENCY METER

BACKGROUND OF THE INVENTION

1. Field of the invention

The present invention relates to an automobile efficiency meter and more particularly to an efficiency meter capable of providing the driver the information as to whether the vehicle is working under the best condition.

2. Description of the Prior Art

It is common that a vehicle is provided with several metering instruments such as a speed meter, an engine tachometer, a fuel meter, a temperature meter etc. so as to evaluate the working condition of the vehicle, Meanwhile, it is regretful there is no measuring device which can be used to evaluate the working efficiency of the vehicle, as a result, the driver can not know the condition of his vehicle even it is working at a pathetic state. In the traditional idea, the fuel is saved as the engine revolution speed increased to accelerate the vehicle; actually, it is an uneconomical driving condition if the vehicle speed exceeds a certain limit owing to accompanied exaggerating increase of fuel consumption. Besides, such a bad driving habit leads to early shortening the vehicle lifetime by exacerbated wearing of the vehicle component parts. It is important to have a measuring device equipped in the vehicle to provide information about the working efficiency of the vehicle so as to palliate the disadvantages described above.

Therefore, an invention devoting to resolving aforesaid disadvantages of current situation is carried out by the present inventor through his long-term research and simulation.

SUMMARY OF THE INVENTION

It is an object of the present invention to provide an automobile efficiency meter which is capable of providing the driver the information as to whether the vehicle is working under the best condition so as to cut down the fuel consumption and prolong the lifetime of the vehicle, and enabling the driver to watch the vehicle condition from time to time during the vehicle is moving.

It is another object of the present invention to provide an automobile efficiency meter which is cable of reminding the driver of the vehicle condition with a pointer type or a digital type measuring instrument, an indicator lamp unit, or a sounder at the crucial moment.

To achieve the above mentioned objects, the automobile efficiency meter of the present invention comprises a vehicle speed signal pick up device, an engine revolution speed signal pick up device, a microprocessor, a conversion and driving circuit, a display device, and a power supplier. By comparing the engine revolution speed signal with the vehicle speed signal and defining an optimistic efficiency zone after analyzing. The driver is then informed about the vehicle condition by a pointer type or a digital type metering instrument, an indicator light unit, or a sounder thereby enabling the driver to keep the vehicle working at the best efficient condition, cut down the fuel consumption, and prolong the vehicle life.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

Figure 1:
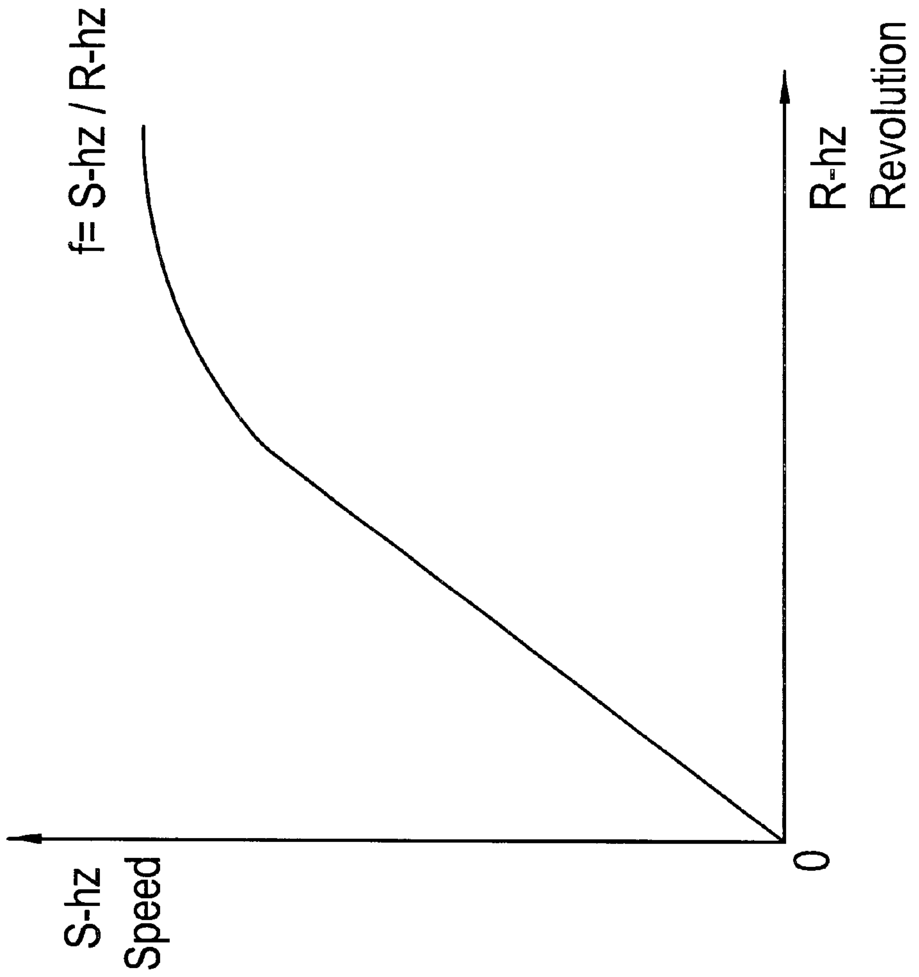
FIG. 1 is a referential slope(f=s-hz/R-hz) curve of the automobile efficiency meter according to the present invention.

In the present invention, a variable of speed-frequency (s-hz) which increases geometrically with increase of the vehicle speed detected by a speed sensor is set on the Y axis of rectangular coordinates. Then another variable of engine revolution-frequency (R-hz) which increases geometrically with increase of the engine rotating speed detected by an engine revolution sensor is set on the X axis of the above rectangular coordinates. By connecting these points on the coordinates formed of variables obtained as such, a slope curve (f=s-hz/R-hz) can be traced as shown in FIG. 1, and the following information can be obtained from the slope curve of FIG. 1:

a. The vehicle efficiency can be further improved if the working point is located at a point where the slope curve is advancing in upward direction;

b. At the vertex of the curve, the vehicle obtains the best working efficiency;

c. The vehicle efficiency will fade away after the working point reaches at the vertex and retreats along the curve;

d. The greater the slope angle is, the better the vehicle acceleration performance is;

e. If the top portion of the curve fluctuates abnormally, it represents that there are some troublesome states with the vehicle.

Hence, a group of referential slope data about the automobile working efficiency can be evaluated according to the aforesaid information.

Figure 2:
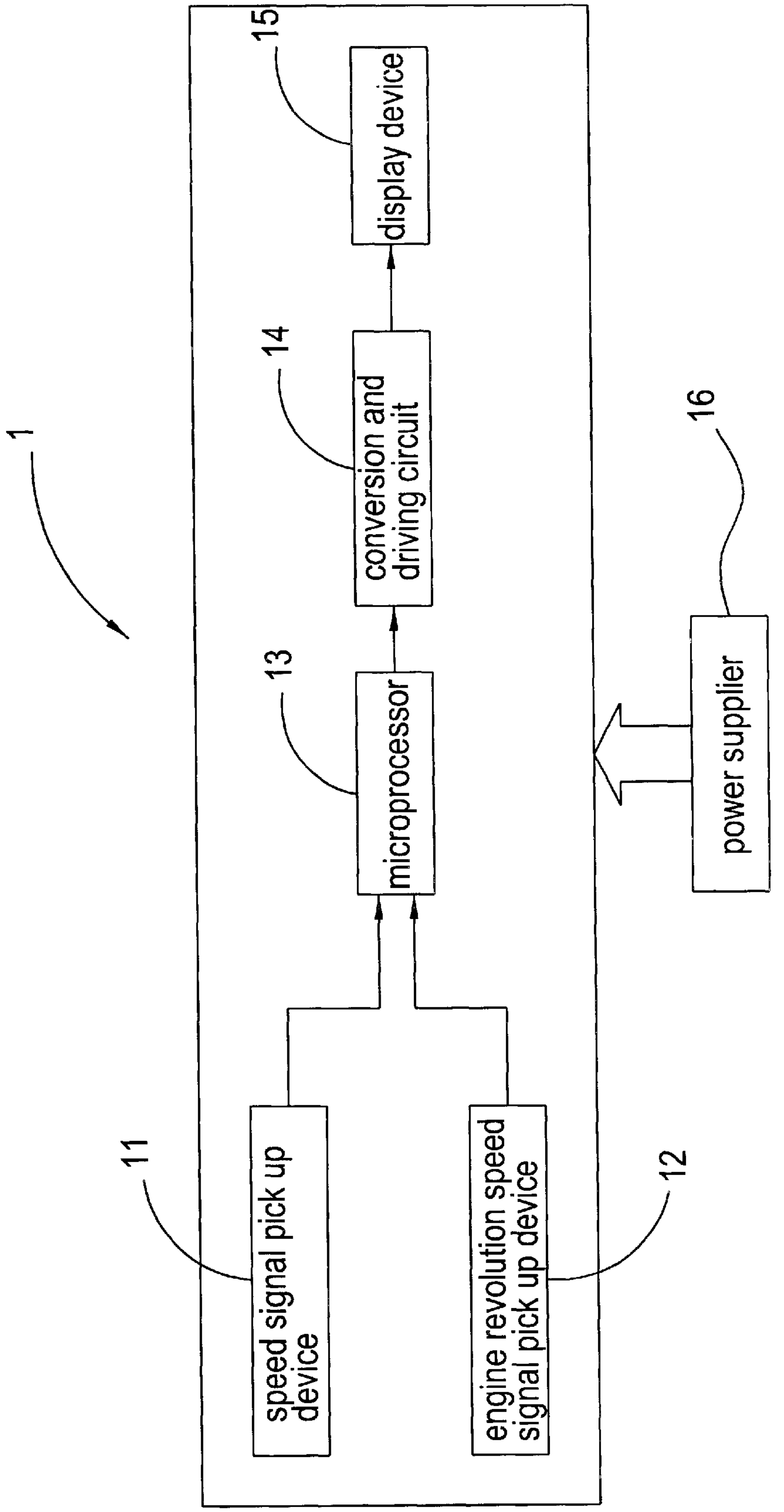
FIG. 2 is a schematic layout diagram for the automobile efficiency meter of the present invention.

Referring to FIG. 2 showing a schematic layout diagram for the automobile efficiency meter of the present invention, an efficiency meter 1 comprises a vehicle speed signal pick up device 11 for picking up said signal with a speed sensor and inputting it into a microprocessor 13; an engine revolution speed signal pick up device 12 for picking up said signal with an engine revolution speed sensor and inputting it into the microprocessor 13; the microprocessor 13 for receiving the speed signal and engine revolution signal and outputting an evaluation signal to a conversion and driving circuit 14 after comparative analysis with the above mentioned referential slope value, the conversion and driving circuit 14 for inputting the evaluation signal and exhibiting the resultant analyzed information on a display device 15 so as to remind the driver of the present automobile efficiency; the display device 15 further includes a pointer type meter, or a digital type meter, or an indicator light unit, or a sounder; and a power supplier 16 for providing a DC power for the present invention.

With this scheme, the actual slope value obtained from actual speed and engine revolution data added with a time axis parameter is compared with the referential slope value thereby obtaining an evaluated resultant value which is displayed by the pointer type or the digital type meter via the conversion and driving circuit 14, the resultant value may be displayed with the indicator light unit or the sounder so that the driver is provided with the information of the present automobile efficiency state.

Figure 3:
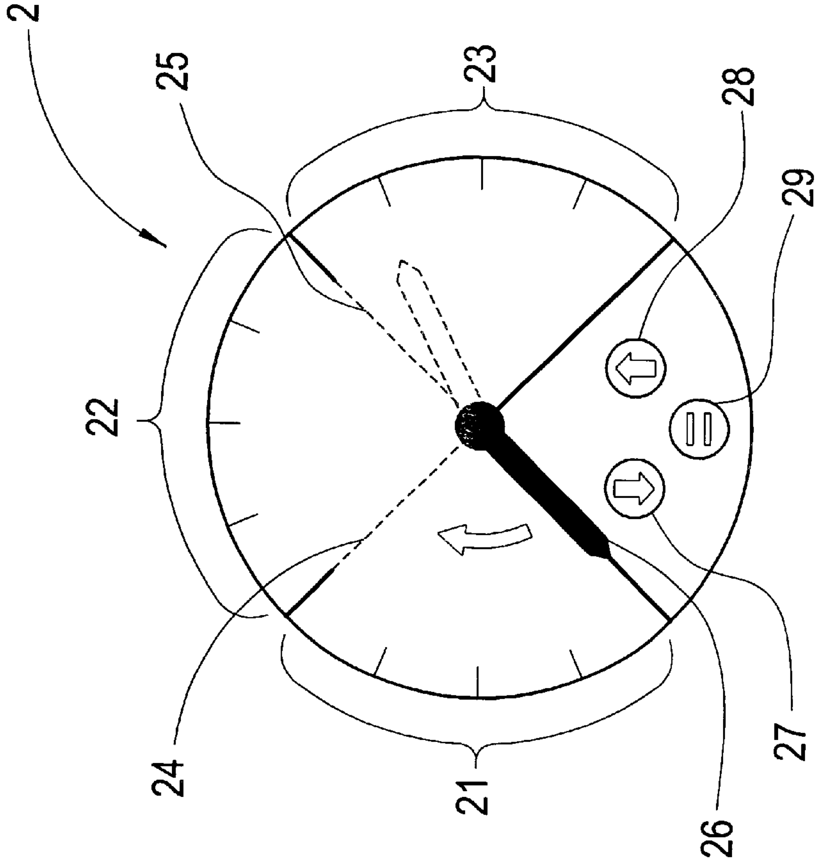
FIG. 3*a* is a schematic view of the automobile efficiency meter of the present invention carried out with a pointer type metering instrument.
FIG. 3*b* is a schematic view of the automobile efficiency meter of the present invention carried out with an indicator lighting unit.
Figure 3:
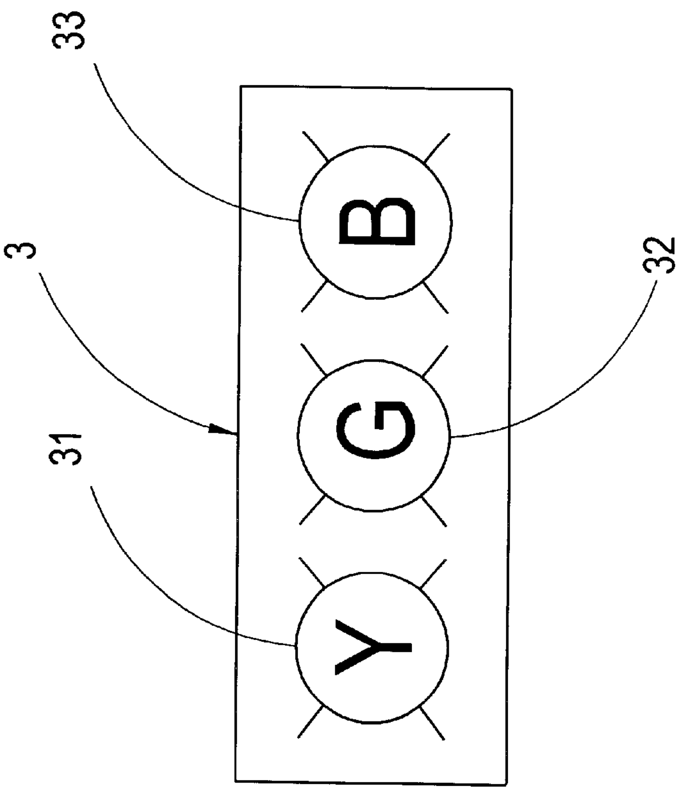

Referring to FIG. 3(*a*), the drawing shows a schematic view of the automobile efficiency meter of the present invention carried out with a pointer type metering instrument. As shown in FIG. 3(*a*), the surface of a pointer type meter 2 is divided into a low efficiency zone 21 extending upwards from the initiation position (zero point) of the pointer, a zone immediately after the low efficiency zone 21 is a medium efficiency zone 22, and a zone following the medium efficiency zone 22 is a high efficiency zone 23. The zones 21, 22 and 23 are all provided with distinctly visible graduations, and the boundaries between adjacent zones are provided with scribing lines 24 and 25. The scribing line 25 between the medium efficiency zone 22 and the high efficiency zone 23 is defined as a threshold line of the best automobile efficiency. The pointer goes up accompanying with a lighted ↑ lamp signal 28 when the automobile efficiency is improved until reaching a maximum value whereat a=lamp signal 29 is turned on thereby indicating the vehicle has reached at the highest efficiency. The pointer 26 goes down accompanying with a lighted ↓ lamp signal 27 when the automobile efficiency degenerates. With the aid of the indication of the pointer 26, and lamp signal 27, 28, 29, the driver is able to keep the automobile at the best working condition so as to save fuel consumption and prolong the vehicle lifetime, and pay attention to the vehicle working condition from time to time.

Referring to FIG. 3(*b*), the drawing shows a schematic view of the automobile efficiency meter of the present invention carried out with an indicator lighting unit. As shown in FIG. 3(*b*), when a yellow lamp 31(Y) is turned on, it represents that the vehicle is at a low efficiency state; when a green lamp 32(G) is turned on, it represents that the vehicle is at a medium efficiency state; when a blue lamp 33(B) is turned on, it represents that the vehicle is at a high efficiency state. By so the driver can also be informed whether the vehicle is at the best efficient condition or not. Besides, in addition to the above mentioned pointer type metering instrument with the indicator lighting unit, a digital type metering instrument and a sounder may be used to serve for the same purpose.

It emerges from the description of the above examples that the invention has several noteworthy advantages, in particular:

1. The present invention enables the driver to know whether the vehicle is at the best efficient condition or not.
2. The present invention can help the vehicle owner to save the fuel and prolong the vehicle life.
3. The present invention can help the driver to pay attention to the vehicle working state from time to time.
4. The efficiency meter of the present invention can be carried out so versatility in many ways such as a pointer type metering instrument, a digital type metering instrument, an indicator lighting unit, and a sounder.

Although the preferred embodiments of the present invention have been disclosed for illustrative purposes, those skilled in the art will be elucidated that various modifications, additions and substitutions are possible, without departing from the scope or the spirit of the invention as disclosed in the accompanying claims.

What is claimed is:

1. An automobile efficiency meter comprising:

a vehicle speed signal pick up device for picking up said signal with a speed sensor and inputting it into a microprocessor;

an engine revolution speed signal pick up device for picking an engine revolution speed signal with an engine revolution speed sensor and inputting it into said micro processor;

the microprocessor for receiving said speed signal and said engine revolution signal and outputting an evaluation signal to a conversion and driving circuit after comparative analysis with a referential slope;

the conversion and driving circuit for inputting said evaluation signal and exhibiting the resultant analyzed information on a display device so as to remind the driver of the present automobile efficiency;

the display device for displaying said resultant analyzed information; and a power supplier for providing a DC power for the aforesaid devices wherein, a speed frequency variable (s-hz) and an engine revolution speed frequency variable (R-hz) are individually defined as a general parameter and inputted into said microprocessor to obtain a referential slope (f=s-hz/R-hz), an actual slope value obtained from an actual speed and an actual engine revolution speed and added with a time axis parameter is compared with said referential slope value thereby obtaining an evaluated resultant value which is then displayed on said display device by said conversion and driving circuit.

2. The automobile efficiency meter in claim 1, wherein said display device is a pointer, a digital metering instrument, or an indicating light unit.

3. The automobile efficiency meter of claim 2, wherein the surface of said, pointer metering instrument is divided into three zones, a low efficiency zone extending upwards from the initiation position (zero position) of the pointer, a medium efficiency zone immediately after said low efficiency zone, and a high efficiency zone immediately following said medium efficiency zone, a scribing line between said medium efficiency zone and said high efficiency zone is defined as a threshold line of the best automobile efficiency, the pointer goes up and down following increase and decrease of the automobile efficiency so as to assist the driver to know about the vehicle working condition from time to time.

4. The automobile efficiency meter of claim 2, wherein lamp signals including ↑,=, and ↓ symbols are added to said pointer metering instrument so as to facilitate the driver understanding the variation of automobile efficiency.

5. The automobile efficiency meter of claim 2, wherein said indicating light unit is composed of several different colored indicator lamps.

* * * * *